US010338732B2

(12) United States Patent
Lee

(10) Patent No.: US 10,338,732 B2
(45) Date of Patent: Jul. 2, 2019

(54) DISPLAYING METHOD OF TOUCH INPUT DEVICE

(71) Applicant: HiDeep Inc., Gyeonggi-do (KR)

(72) Inventor: Young Min Lee, Gyeonggi-do (KR)

(73) Assignee: HiDeep Inc. (KR)

( * ) Notice: Subject to any disclaimer, the term of this patent is extended or adjusted under 35 U.S.C. 154(b) by 0 days.

(21) Appl. No.: 15/431,980

(22) Filed: Feb. 14, 2017

(65) Prior Publication Data

US 2017/0322666 A1 Nov. 9, 2017

(30) Foreign Application Priority Data

May 3, 2016 (KR) .................. 10-2016-0054375

(51) Int. Cl.
*G06F 3/041* (2006.01)
*G06F 3/044* (2006.01)
(Continued)

(52) U.S. Cl.
CPC .......... *G06F 3/0416* (2013.01); *G06F 1/3218* (2013.01); *G06F 3/044* (2013.01);
(Continued)

(58) Field of Classification Search
CPC ............. G06F 3/0416; G06F 3/044; G06F 2203/04105; G06F 1/3218; G06F 3/0488; G06F 3/048
See application file for complete search history.

(56) References Cited

U.S. PATENT DOCUMENTS 8,127,254 B2 * 2/2012 Lindberg ............ G06F 3/04817
715/863
2010/0306693 A1 * 12/2010 Brinda .................. G06F 3/0488
715/784
(Continued)

FOREIGN PATENT DOCUMENTS

JP 2011048675 3/2011
JP 2012073785 4/2012
(Continued)

OTHER PUBLICATIONS

Corresponding Office Action issued by the JPO dated Feb. 28, 2017.
(Continued)

*Primary Examiner* — Jonathan A Boyd
(74) *Attorney, Agent, or Firm* — The Belles Group, P.C.

(57) ABSTRACT

A displaying method of a touch input device including a touch screen, a touch screen controller which detects a magnitude of a pressure of a touch input to a surface of the touch screen, and a controller which controls the touch screen on the basis of information detected by the touch screen controller, the displaying method including: detecting, by the touch screen controller, a magnitude of the pressure of the touch which is input to a first region when an object touches the first region of the surface of the touch screen in a state where a display of the touch screen is turned off, and displaying by controlling, by the controller, the touch screen such that, when the detected magnitude of the pressure is greater than that of a first reference pressure, a second region of the display of the touch screen is displayed.

28 Claims, 12 Drawing Sheets

(51) Int. Cl.
*G06F 3/048* (2013.01)
*G06F 3/0488* (2013.01)
*G06F 1/3218* (2019.01)

(52) U.S. Cl.
CPC ............ *G06F 3/048* (2013.01); *G06F 3/0488* (2013.01); *G06F 2203/04105* (2013.01)

(56) References Cited

U.S. PATENT DOCUMENTS

| | | | | |
|---|---|---|---|---|
| 2011/0256848 | A1* | 10/2011 | Bok | G06F 3/04883 455/411 |
| 2012/0098639 | A1* | 4/2012 | Ijas | G06F 3/04883 340/5.51 |
| 2013/0169568 | A1* | 7/2013 | Park | G06F 3/0488 345/173 |
| 2013/0181931 | A1* | 7/2013 | Kinoshita | G06F 3/0416 345/173 |
| 2015/0234586 | A1 | 8/2015 | Lee et al. | |
| 2016/0041684 | A1* | 2/2016 | Rhee | G06F 3/0416 345/173 |
| 2016/0274728 | A1 | 9/2016 | Luo et al. | |

FOREIGN PATENT DOCUMENTS

| | | |
|---|---|---|
| JP | 2015167045 | 9/2015 |
| KR | 10-2013-0043292 A | 4/2013 |
| KR | 10-2015-0064968 A | 6/2015 |
| KR | 10-2015-0068330 A | 6/2015 |
| KR | 20150061336 | 6/2015 |
| KR | 10-2015-0098115 A | 8/2015 |
| KR | 10-2016-0019187 A | 2/2016 |

OTHER PUBLICATIONS

International Search Report and Written Opinion for Corresponding International Application PCT/KR2017/002716, dated Jul. 7, 2017.
Corresponding Office Action issued by the KIPO dated Nov. 21, 2017.

* cited by examiner

DISPLAYING METHOD OF TOUCH INPUT DEVICE

CROSS REFERENCE TO RELATED APPLICATIONS

Priority is claimed under 35 U.S.C. § 119 to Korean Patent Application No. 10-2016-0054375, filed May 3, 2016, the disclosure of which is incorporated herein by reference in its entirety.

BACKGROUND

Field

The present disclosure relates to a displaying method of a touch input device, and more particularly to a displaying method of a touch input device capable of executing various applications by using a new type of touch based on a touch pressure.

Description of the Related Art

Today, electronic systems such as a TV, a smartphone a PMP, a laptop Computer, a PDA, etc., are equipped with a variety of input/output devices. The various input/output devices are provided to allow a user to conveniently control the above systems. However, there is a limit to install the input/output devices in the electronic systems having a small size such as a mobile phone, an M3 player, a PMP, a laptop computer, a PDA, etc. As a result, a touch panel, a touch screen, a navigation pad, etc., have a tendency to be mounted in these devices as part of an effort to improve the user interface. Also, an integrated computer and tablet computer adopting the touch screen are distributed, so that there is a demand for various types of user interfaces.

Recently, a mouse and keyboard in a common personal computer is now being replaced with a touch screen capable of allowing the user to input data and to input commands even in a small space in various ways. Therefore, a variety of user interfaces on the touch screen are now being developed.

Among the various user interfaces on the touch screen, there is an interface in which the display of the touch screen is turned on by user's simple operation on the touch screen in a state where the display of the touch screen is turned off. The user's simple operation includes, for example, touching the surface of the touch screen for more than a certain period of time or multiple times, etc. However, these examples of turning on the display by the user's simple operation mean that the "entire" display is turned on. Therefore, not a little power loss is caused and "information" that can be displayed on the display is simply limited to, for example, time, date, and photo. Accordingly, this is not effective.

Therefore, there is a requirement for a method for efficiently displaying information that the user wants on a portion of the display instead of the entire of the display by the user's simple operation in the state where the display of the touch screen is turned off.

Also, a method for recognizing the touch, in the state where the display of the touch screen is turned off, uses only whether the touch occurs or not and/or the position information. Therefore, a touch irrelevant to the user's intention may be recognized through the touch screen, so that malfunction may significantly occur. The touch irrelevant to the user's intention makes it difficult to implement a low power mode, and the malfunction makes the user feel uncomfortable.

BRIEF SUMMARY

One embodiment is a displaying method of a touch input device including a touch screen, a touch screen controller which detects a magnitude of a pressure of a touch input to a surface of the touch screen, and a controller which controls the touch screen on the basis of information detected by the touch screen controller. The displaying method includes: detecting, by the touch screen controller, a magnitude of the pressure of the touch which is input to a first region when an object touches the first region of the surface of the touch screen in a state where a display of the touch screen is turned off; and displaying by controlling, by the controller, the touch screen such that, when the detected magnitude of the pressure is greater than that of a first reference pressure, a second region of the display of the touch screen is displayed.

The first region may not overlap with the second region.

At least a portion of the first region may overlap with a portion of the second region.

The first region may be included in the second region.

In the displaying, the controller may control a display area of the second region to correspond to the magnitude of the pressure.

In the displaying, the controller may control a portion of an initial screen or lock screen to be displayed on the second region.

In the displaying, when the magnitude of the pressure is greater than that of a second reference pressure, the controller may control the entire initial screen or lock screen to be displayed.

In the displaying, the controller may control a portion of an execution screen of a predetermined application to be displayed on the second region.

In the displaying, when the magnitude of the pressure is greater than second reference pressure greater first reference pressure, the controller may control execution screen to be displayed.

In the displaying, the controller may control information which is displayed on the second region to be different in accordance with the magnitude of the pressure.

In the displaying, the controller may control information which is displayed on the second region to be different in accordance with a position of the first region of the surface of the touch screen.

In the displaying, the state where the second region is being displayed, the controller may control the second region to be turned off immediately after the magnitude of the pressure of the touch which is input to the first region becomes equal to or less than that of a predetermined third reference pressure.

The third reference pressure may be the first reference pressure.

The third reference pressure may be 0.

The third reference pressure may be greater than 0 and less than the first reference pressure.

In the displaying, in the state where the second region is being displayed, the controller may control the second region to be turned off after a predetermined delay time has elapsed from immediately after the magnitude of the pressure of the touch which is input to the first region becomes equal to or less than that of a predetermined third reference pressure.

The third reference pressure may be the first reference pressure.

The third reference pressure may be 0.

The third reference pressure may be greater than 0 and less than the first reference pressure.

In the displaying, in the state where the second region is, being displayed, the controller may control to maintain the second region in a turned-on state when the object separates from the surface of the touch screen. In the displaying, in the state where the second region is maintained in the turned-on state, the controller may control the second region to be turned off when the magnitude of the pressure of the touch which is input to the surface of the touch screen is greater than that of a third predetermined reference pressure.

The third reference pressure may be the first reference pressure.

The third reference pressure may be 0.

The third reference pressure may be greater than 0 and less than the first reference pressure.

In the displaying, when the object touches the first region at least twice for a first predetermined time period and a pressure of the final touch of the object is greater than the first reference pressure, the controller may control the touch screen such that the second region of the surface is displayed.

BRIEF DESCRIPTION OF THE DRAWINGS

The present disclosure will become more fully understood from the detailed description and the accompanying drawings, wherein.

DETAILED DESCRIPTION

Figure 1:
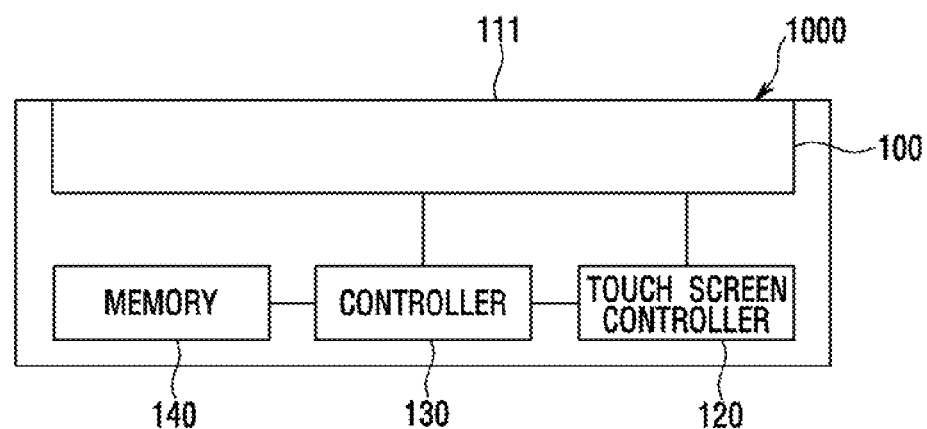
FIG. 1 is a view showing a structure of a touch input device according to an embodiment of the present invention.

The following detailed description of the present invention shows a specified embodiment of the present invention and will be provided with reference to the accompanying drawings. The embodiment will be described in enough detail that those skilled in the art are able to embody the present invention. It should be understood that various embodiments of the present invention are different from each other and need not be mutually exclusive. For example, a specific shape, structure and properties, which are described in this disclosure, may be implemented in other embodiments without departing from the spirit and scope of the present invention with respect to one embodiment. Also, it should be noted that positions or placements of individual components within each disclosed embodiment may be changed without departing from the spirit, and scope of the present invention. Therefore, the following detailed description is not intended to be limited. If adequately described, the scope of the present invention is limited only by the appended claims of the present invention as well as all equivalents thereto. Similar reference numerals in the drawings designate the same or similar functions in many aspects.

FIG. 1 is a view showing a structure of a touch input device according to an embodiment of the present invention.

The touch input device 1000 according to the embodiment of the present invention may include a touch screen 100 and a touch screen controller 120, The touch input device 1000 according to the embodiment of the present invention includes the touch screen 100 and is a computing device capable of allowing an input to the touch input device 1000 to be performed by touching the touch screen 100.

The touch input device 1000 according to the embodiment of the present invention is just an example of a portable electronic device such as a smartphone. The touch input device 1000 may include components more or less than those shown in FIG. 1, or may selectively include a combination of the components or may selectively include different configurations or arrangements of the components. The various components shown in FIG. 1 may be implemented by hardware, software, or a combination of both hardware and software as well as by one or more signal processes and/or application specific integrated circuit.

The touch input device 1000 according to the embodiment of the present invention may be a portable electronic device such as a laptop computer, a personal digital assistant (PDA), and a smartphone. Also, the touch input device 1000 according to the embodiment of the present invention may be a non-portable electronic device such as a desktop computer and a smart television.

The touch screen 100 allows a user to operate a computing system by touching the surface of the touch screen 100 by means of an object such as a finger. Generally, the touch screen 100 recognizes the touch on the surface thereof, and the computing system analyzes such a touch. Accordingly, operations may be performed.

When the touch occurs on the touch screen 100, the touch screen controller 120 may detect whether the touch occurs on the touch screen 100 or not and a touch position (or coordinate). Also, when the touch occurs on the touch screen 100, the touch screen controller 120 according to the embodiment of the present invention may measure the change amount of the capacitance occurring according to the touch. For example, the size of the change amount of a mutual capacitance may be changed according to a magnitude of a touch pressure and/or a touch area.

When a predetermined touch is input to the touch screen 100 by an object, the touch screen controller 120 may measure the size of the capacitance change amount according to the magnitude of the touch pressure. Here, the less the magnitude of the touch pressure is, the less the capacitance change amount may be, and the greater the magnitude of the touch pressure is, the greater the capacitance change amount may be.

A controller 130 may calculate a touch time, period by using the capacitance change amount transferred from the touch screen controller 120.

The controller 130 may receive the touch position and the magnitude of the touch pressure from the touch screen controller 120 and control a memory 140 and the touch screen 100 in accordance with a predetermined method. For example, the controller 130 may read predetermined information from the memory 140 and control the information to be displayed on the touch screen 100.

Although FIG. 1 shows that the touch screen controller 120 and the controller 130 are physically separated from each other, this is just an example and there is no limitation to this. The touch screen controller 120 and the controller 130 may be physically implemented as a single device.

The memory 140 selectively includes a high speed random access memory or selectively includes at least one magnetic disk storage device, a flash memory device, or a non-volatile memory such as a non-volatile solid state memory device.

The memory 140 includes at least one computer-readable component. Specifically, the memory 140 may include an operating system, a graphic module, and applications.

The operating system may be, for example, an embedded operating system such as Darwin, RTXC, LINUX, UNIX, OS X, WINDOWS, or WxWorks. The operating system includes various software components and/or drivers for controlling and managing general system tasks (e.g., memory management, storage device control, power management, etc.) and facilitates communications between a variety of hardware and software components.

The graphic module includes components for changing visual impacts (e.g., brightness, transparency, saturation, contrast, or other visual attributes) of a graphic to be displayed on the touch screen 100 and includes a variety of known software components for rendering and displaying the graphic on other displays. As used in this specification, the term "graphic" includes any object which can be displayed to the user and includes texts, web pages, icons (e.g., user interface objects including soft keys), digital images, videos, animations, etc., without limitation.

The applications may include not only weather, stocks, a browser, an address book, a contact list, email, instant messaging, word processing, keyboard emulation, widget, JAVA-supported applications, encryption, digital right management, voice recognition, voice replication, location determination capability (that is provided by a global positioning system (sometimes referred to as "GPS" in this specification), etc.), a music player, etc., (not limited to these), but also any application which is installed on the memory 140.

Besides, the memory 140 may facilitate communications with other devices through at least one external port and include a communication module including a variety of software components for processing data received by an RF circuit and/or external ports.

The touch screen 100 shown in FIG. 1 may include a display module. The display module may be controlled by the controller 130 and display predetermined information required by the controller 130. The display module may be an LCD, module 150a shown in FIG. 2a or may be an OLE) module 150b shown in FIG. 2b.

Figure 2A:
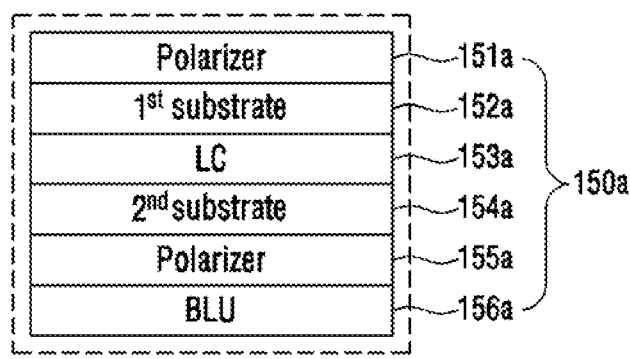
FIGS. 2a and 2b are views for describing an example of a display module included in a touch screen.

The LCD module 150a shown in FIG. 2a may include an upper polarizer 151a, a first substrate layer 152a disposed under the upper polarizer 151a, a liquid crystal layer 153a disposed under the first substrate layer 152a, a second substrate layer 154a disposed under the liquid crystal layer 153a, a lower polarizer 155a disposed under the second substrate layer 154a, and a backlight unit 156a disposed under the lower polarizer 155a. Here, the first substrate layer 152a may be color filter glass, and the second substrate layer 154a may be TFT glass. Also, at least any one of the first substrate layer 152a and the second substrate layer 154a may be made of a bendable material such as a plastic.

Figure 2B:
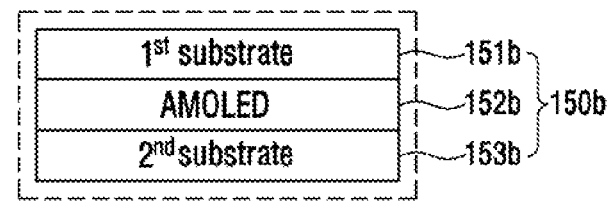

The OLED module 150b shown in FIG. 2b may include a first substrate layer 151b, an AMOLED 152b disposed under the first substrate layer 151b, and a second substrate layer 153b disposed under the AMOLED 152b, Here, the first substrate layer 151b may be encapsulation glass, and the second substrate layer 153b may be TFT glass. Also, at least any one of the first substrate layer 151b and the second substrate layer 153b may be made of a bendable material such as a plastic. Meanwhile, though not shown in a separate figure, the polarizer may be further disposed on the first substrate layer 151b in the display module 150b shown in FIG. 2b.

The touch screen 100 shown in FIG. 1 may include a sensor for sensing the position and pressure of the touch which is input to a surface 111 by the object.

Here, the sensor may include a position sensor for sensing the touch position and a pressure sensor for sensing the touch pressure. The position sensor and the pressure sensor may be provided separately. Alternatively, one sensor may sense the touch position and the touch pressure. When the position sensor and the pressure sensor are provided separately, the pressure sensor may be disposed on or under the above-described display module or may be disposed within the display module. A signal generated by the pressure sensor may be transmitted to the touch screen controller 120, and the touch screen controller 120 may measure the capacitance change amount from the transmitted signal. The controller 130 may calculate the magnitude of the touch pressure from the capacitance change amount measured by the touch screen controller 120.

In a state where a display of the touch screen 100 is turned off, the controller 130 shown in FIG. 1 may detect the pressure of the touch input to the surface 111 of the touch screen 100, control some regions of the display of the touch screen 100 to be turned on in accordance with the magnitude of the touch pressure, and control predetermined information to be displayed, and control to maintain the remaining regions in the turned-off state or control the remaining regions to operate in a state equivalent to the turned-off state. Here, the predetermined information that is displayed on some regions of the display of the touch screen 100 may have been stored in the memory 140. The information stored in the memory 140 may correspond to a portion of an initial screen or lock screen that is displayed when the entire display of the touch screen 100 is turned on or may correspond to a portion of an execution screen of a predetermined application.

Hereinafter, a displaying method of the touch input device according to the embodiment of the present invention will be described in detail with reference to the accompanying drawings.

Figure 3:
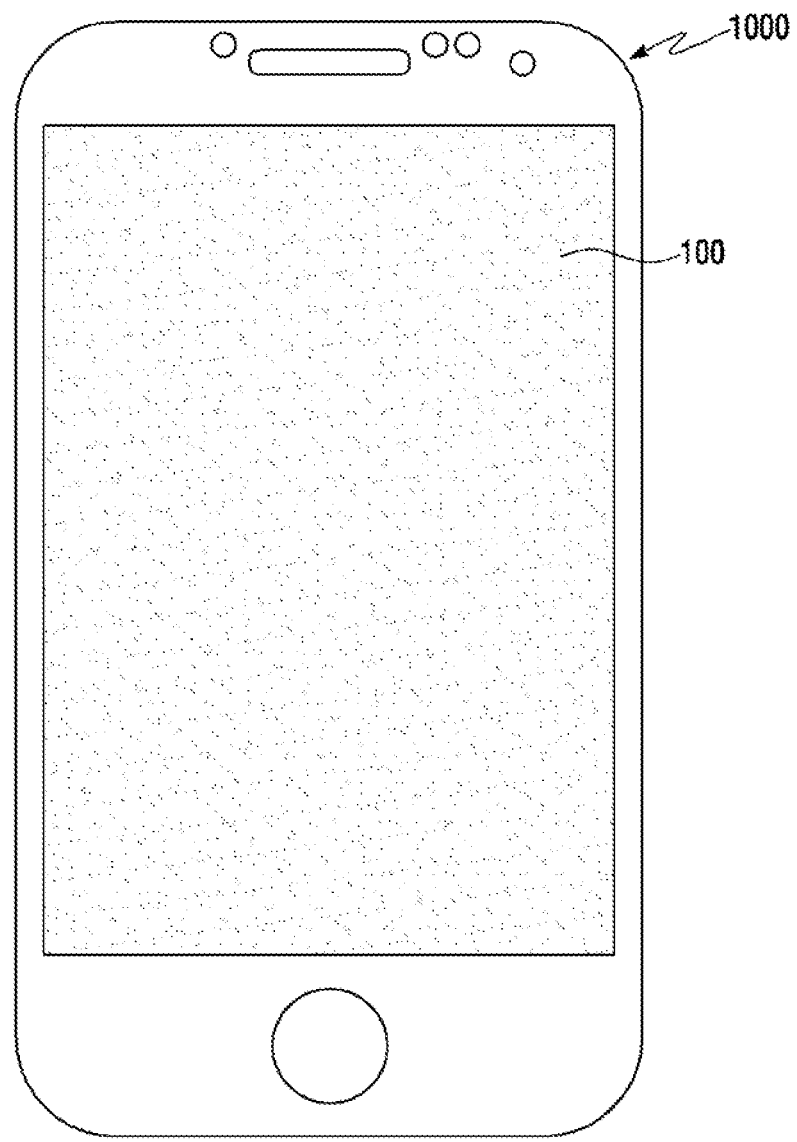
FIG. 3 shows a state where the touch input device which performs a displaying method according to the embodiment of the present invention is operating in a low power mode.
Figure 4:
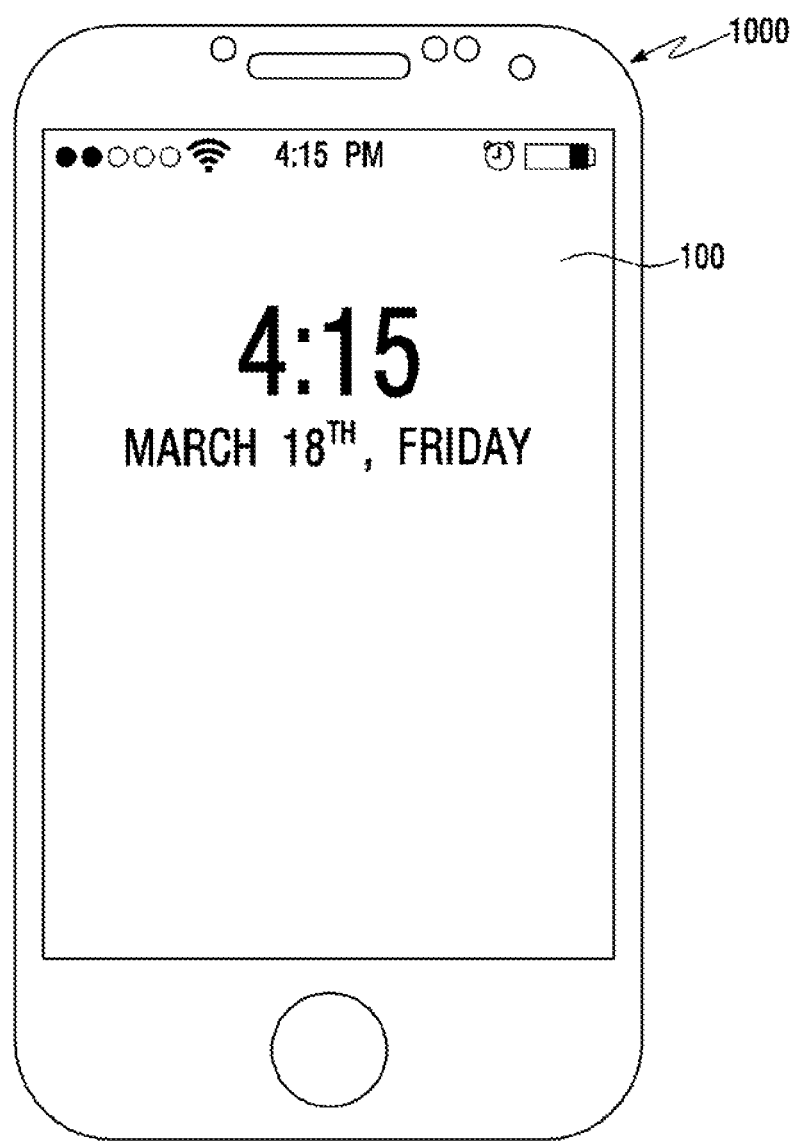
FIG. 4 shows a state where the touch input device which performs the displaying method according to the embodiment of the present invention is operating in a display mode.

FIG. 3 shows a state where the touch input device which performs the displaying method according to the embodiment of the present invention is operating in a low power mode. FIG. 3 shows that the display of the touch screen 100 has been turned off. FIG. 4 shows that the entire display of the touch input device which performs the displaying method according to the embodiment of the present invention has been turned on.

Referring to FIGS. 3 and 4, the touch input device 1000 includes the touch screen 100 shown in FIG. 1. The touch screen controller 120, the controller 130, and the memory 140 shown in FIG. 1 are mounted within the touch input device 1000.

The surface of the touch screen 100 may be exposed to the outside of the touch input device 1000, and a predetermined object such as a user's finger may touch the surface of the touch screen 100.

The touch input device 1000 shown in FIG. 3 is operating in a low power mode. This does not mean that the touch input device 1000 including the touch screen 100 is powered off, but means the display of the touch screen 100 is turned off. When the touch input device 1000 operates in a low power mode, the display of the touch screen 100 can be turned on at any time by user's action (e.g., an action of touching a power button, action of pressing the power button, or action of pressing a predetermined button provided on the side of the touch input device 1000) or by a communication with the outside (call reception, message reception, email reception), etc.

In the low power mode of the touch input device 1000, the display of the touch screen 100 is turned off, so that the surface of the touch screen 100 displays black. FIG. 3 shows that the surface of the touch screen 100 displays black.

Meanwhile, when the display of the touch screen 100 is turned on by applying a drive signal to the display module disposed within the touch screen 100, the touch screen 100 may, as shown in FIG. 4, operate in a display mode which shows the initial screen or lock screen.

When the display of the touch screen 100 is turned off, the controller 130 mounted within the touch input device 1000 may detect the pressure of the touch input to the surface of the touch screen 100, control some regions of the display of the touch screen 100 to be turned on in accordance with the magnitude of the touch pressure and control the predetermined information to be displayed, and control to maintain the remaining regions in the turned-off state or control the remaining regions to operate in a state equivalent to the turned-off state. Here, the state equivalent to the turned-off state means that while the remaining regions of the display of the touch screen 100 are turned on, the remaining regions display as if they are turned off or display that they are similar to being turned off. For example, the state equivalent to the turned-off state may mean that the remaining regions display black.

In the state where the display of the touch screen 100 is turned off, a region where the object touches the surface of the touch screen 100 and some regions where the predetermined information is displayed may not or may partially overlap with each other. Alternatively, any one of the two regions may be included in the other. This will be described in detail with reference to FIGS. 5 to 7.

Figure 5:
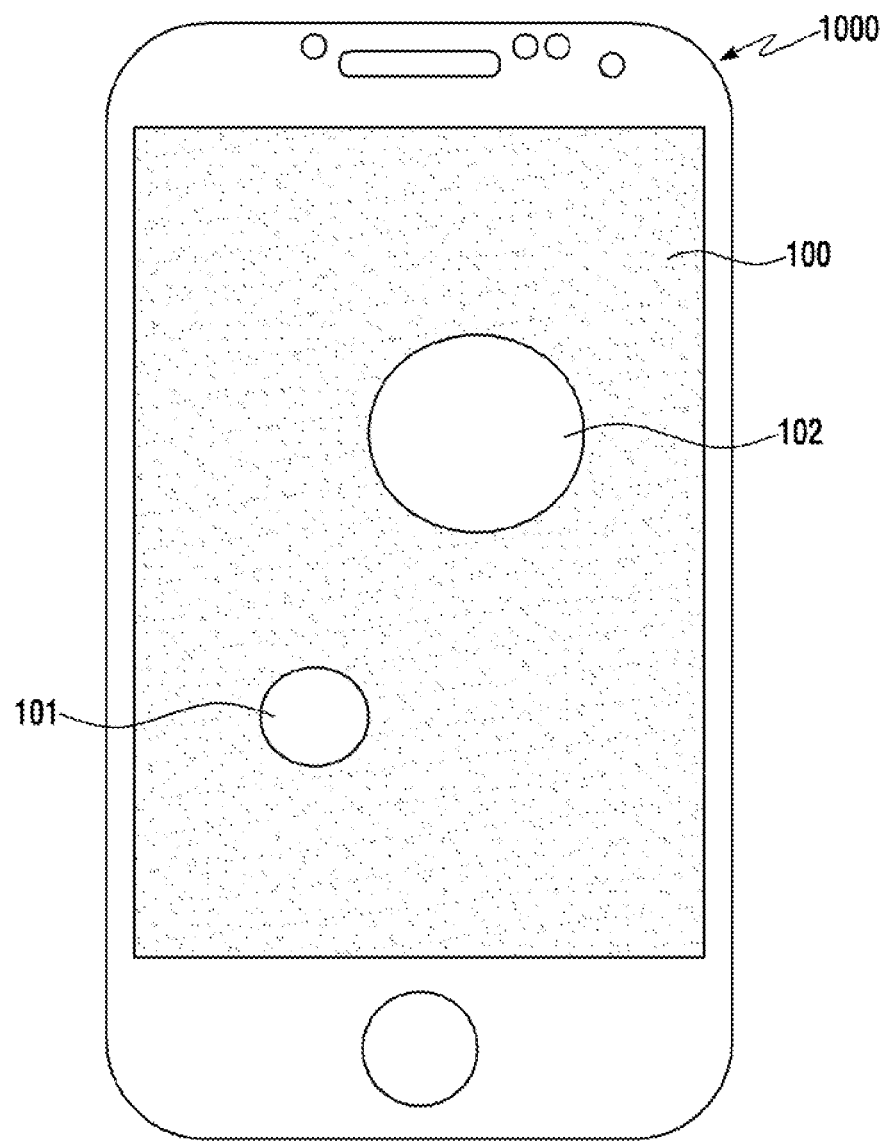
FIGS. 5 to 7 are views for describing regions 101, 101', and 101" that an object touches and some regions 102, 102', and 102" which operate in the display mode.
Figure 6:
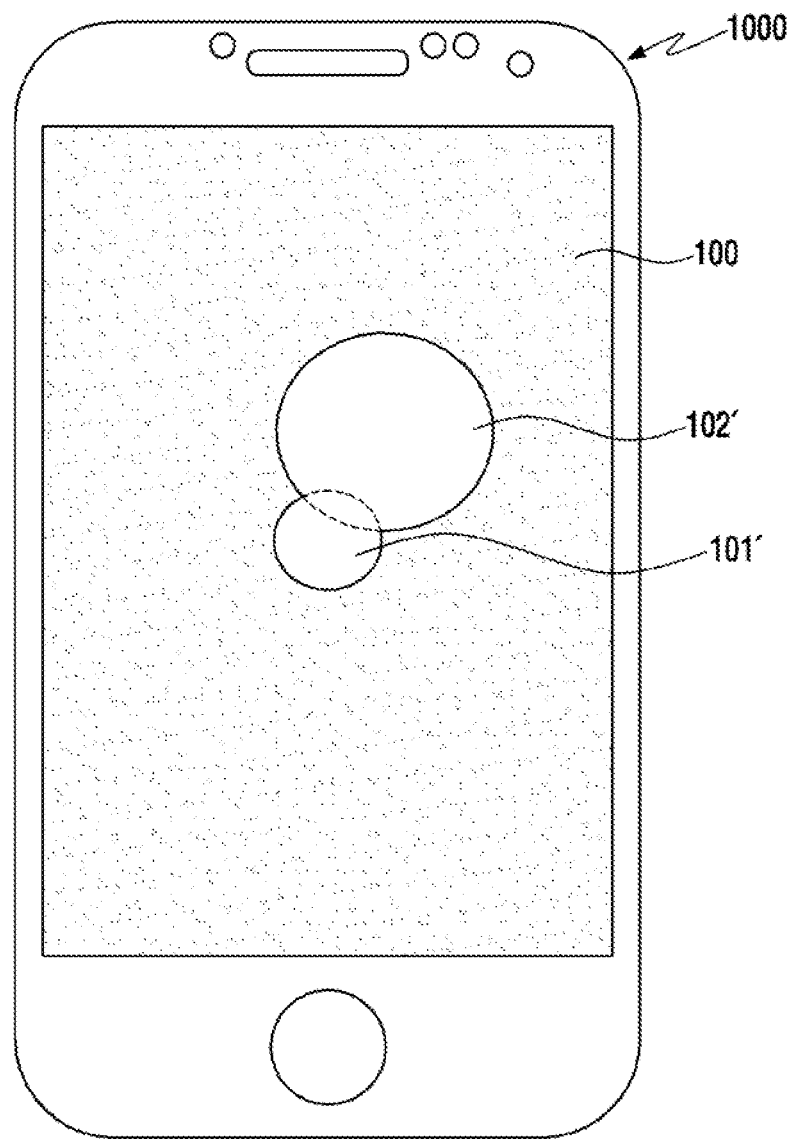
Figure 7:
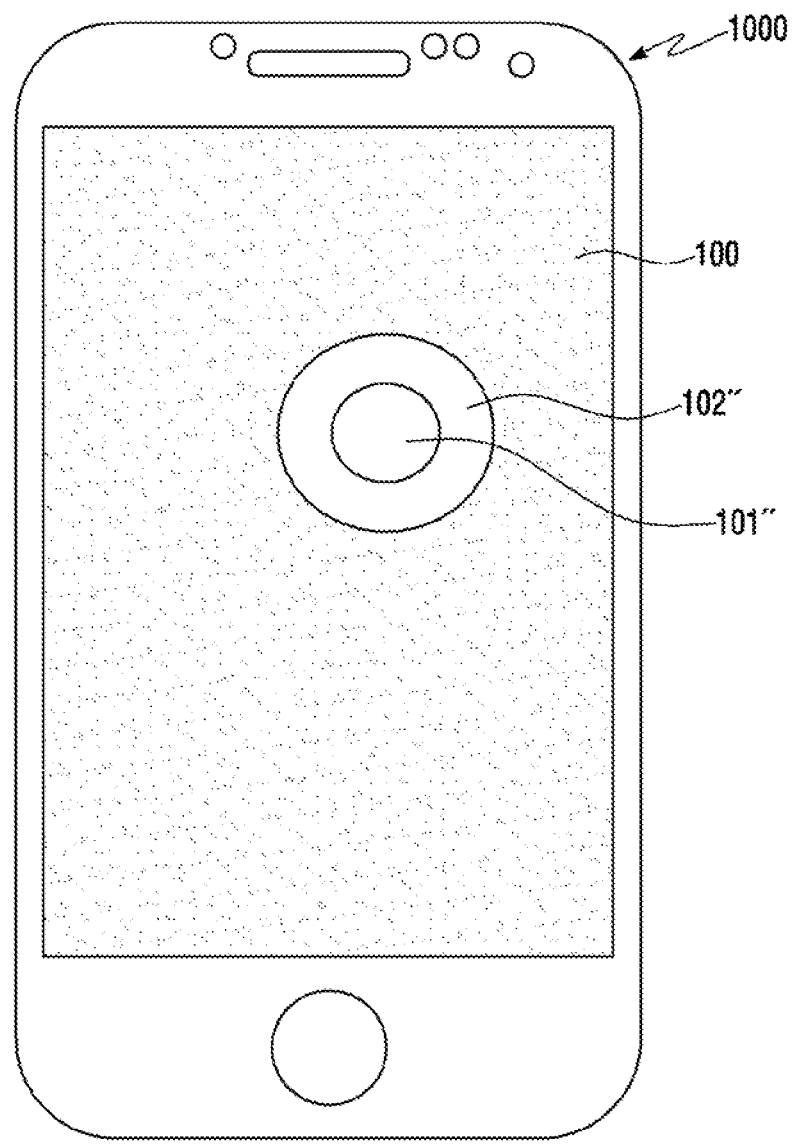

FIGS. 5 to 7 are views for describing regions 101, 101', and 101" where the object touches the surface of the touch screen 100 and some regions 102, 102', and 102" where the predetermined information is displayed.

Referring to FIG. 5, when a predetermined object touches the first region 101 of the surface of the touch screen 100, the controller 130 shown in FIG. 1 may control the second region 102 of the display of the touch screen 100 to be displayed. That is, the controller 130 controls the first region 101 that the object touches not to overlap with the second region 102 where the predetermined information is displayed, thereby preventing the second region 102 from being hidden by the object.

Referring to FIG. 6, when a predetermined object touches the first region 101' of the surface of the touch screen 100, the controller 130 shown in FIG. 1 may control the second region 102' of the display of the touch screen 100 to be displayed. That is, the controller 130 controls a portion of the first region 101' that the object touches to overlap with a portion of the second region 102' where the predetermined information is displayed, thereby causing the predetermined information to be displayed through the second region 102' in the vicinity of the first region 101' that the object touches.

Referring to FIG. 7, when a predetermined object touches the first region 101" of the surface of the touch screen 100, the controller 130 shown in FIG. 1 may control the second region 102" of the display of the touch screen 100 to be displayed. That is, the controller 130 controls the first region 101" that the object touches to be included in the second region 102" where the predetermined information is displayed, thereby causing the predetermined information to be displayed around the first region 101" through the second region 102".

Figure 8:
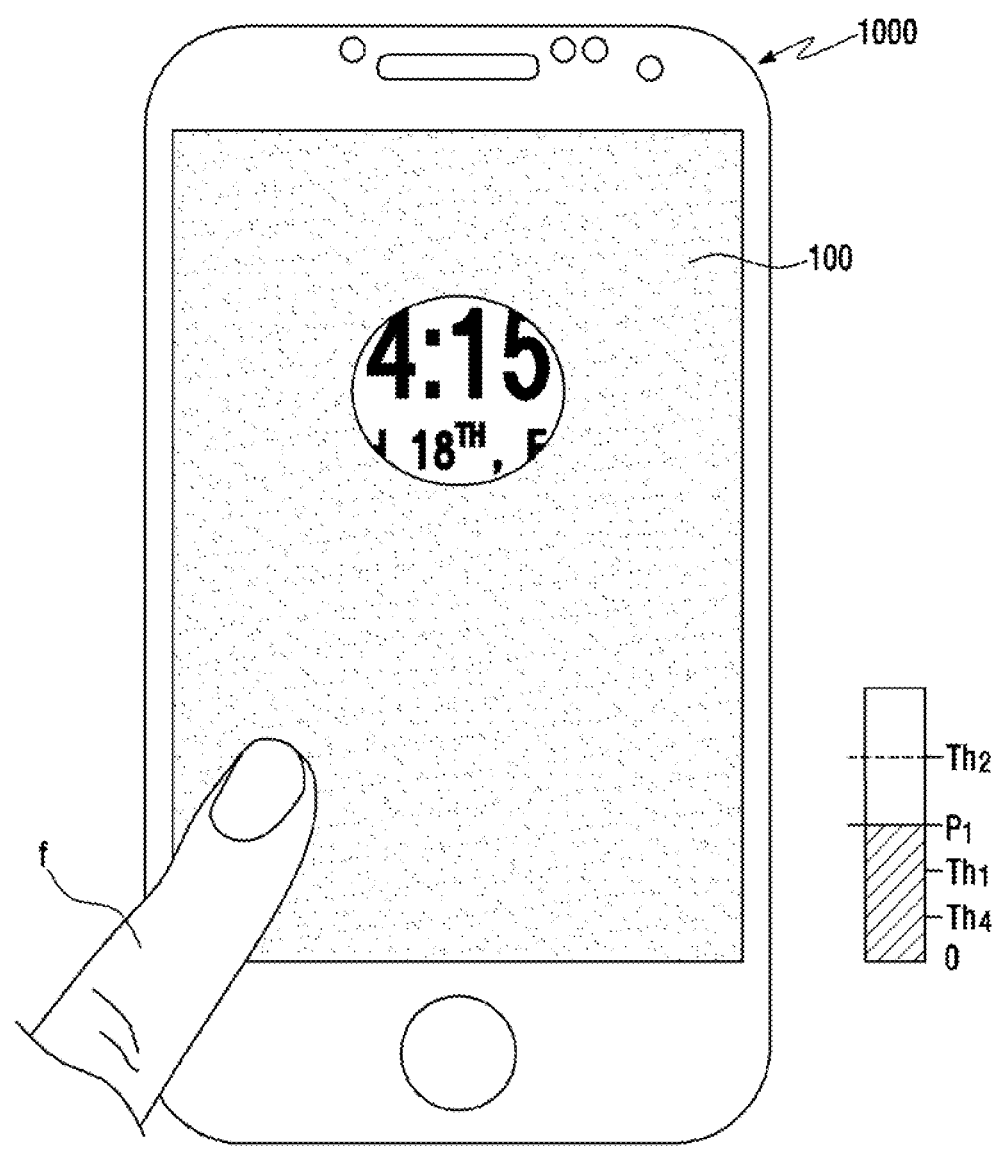
FIGS. 8 to 9 are views showing that the surface of the touch screen 100 displays information in response to the touch on the surface of the touch screen 100 by the object "f" at, a predetermined pressure.
Figure 9:
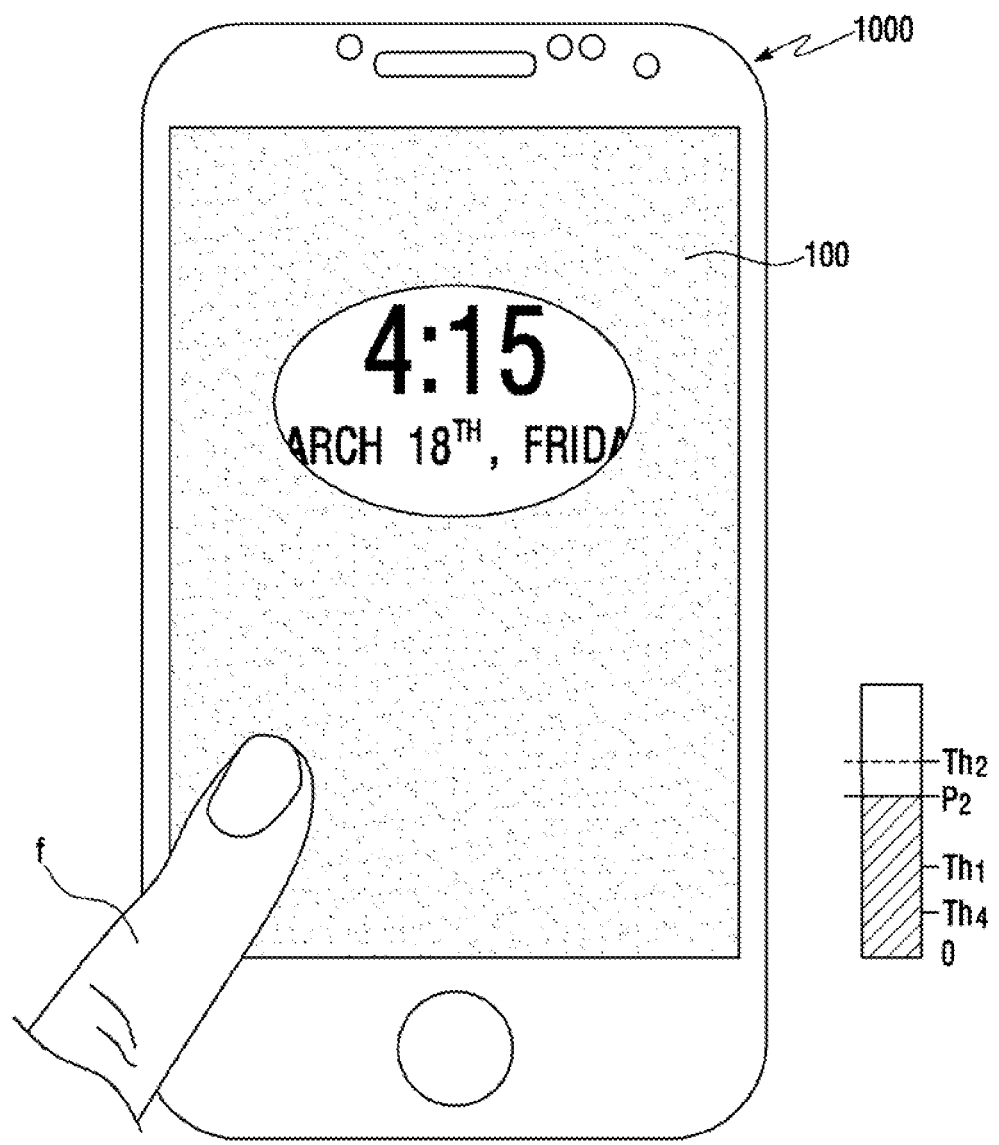

FIGS. 8 to 9 are views showing an example of information which is displayed on the display of the touch screen 100 in response to the touch on the surface of the touch screen 100 by the object "f" at a predetermined pressure.

The example shown in FIG. 8 shows that the region where the object touches the surface of the touch screen 100 is different from the region where the predetermined information is displayed. However, there is no limitation to this. As shown in FIGS. 6 and 7, the region where the object "f" touches the surface of the touch screen 100 may partially overlap with the region where the predetermined information is displayed, or any one of the two regions may be included in the other.

The example shown in FIG. 8 shows that the object "f" presses the first region of the surface of the touch screen 100 at a first pressure P1 in the state where the display of the touch screen 100 is turned off. In this case, the controller 130 shown in FIG. 1 turns on the second region of the display of the touch screen 100 and displays the predetermined information, and then controls to maintain the remaining regions in the turned-off state or controls the remaining regions to operate in a state equivalent to the turned-off state.

The magnitude of the first pressure P1 is greater than that of a first predetermined reference pressure Th1.

Here, the first reference pressure Th1 has the minimum pressure value for turning on the second region of the display of the touch screen 100. Here, the first reference pressure Th1 may be used to distinguish between a general touch (or 2D touch) and a pressure touch (or 3D touch) or may be different from a pressure which is used to distinguish between a general touch (or 2D touch) and a pressure touch (or 3D touch). For example, when the first reference pressure Th1 may be greater or less than the pressure which is used to distinguish between a general touch (or 2D touch) and a pressure touch (or 3D touch). In a case where the first reference pressure Th1 is the same as the pressure which is used to distinguish between a general touch (or 2D touch) and a pressure touch (or 3D touch), when the object "f" presses the surface of the touch screen 100 at a pressure less than the first reference pressure Th1, the controller 130 determines the input of the object "f" as a general touch (or 2D touch) and continues to maintain the display of the touch screen 100 in the turned-off state, and when the object "f" presses the surface of the touch screen 100 at a pressure greater than the first reference pressure Th1, the controller 130 determines the input of the object "f" as a pressure touch (or 3D touch) and controls the second region of the display of the touch screen 100 to operate in the display mode.

Here, the controller 130 may display the predetermined information on the second region operating in the display mode. The predetermined information to be displayed may be a portion of the initial screen or lock screen shown in FIG. 4.

The example shown in FIG. 9 shows that the object "f" presses the surface of the touch screen 100 at a second pressure P2 greater than the first pressure P1 shown in FIG. 8. In this case, the controller 130 shown in FIG. 1 turns on the second region of the display of the touch screen 100 larger than the second region shown in FIG. 8 and displays the predetermined information, and then controls to maintain the remaining regions in the turned-off state or controls the remaining regions to operate in a state equivalent to the turned-off state.

Here, as with the example shown in FIG. 8, the example shown in FIG. 9 may show that the object "f" presses the Surface of the touch screen. 100 at the second pressure P2 in the state where the display of the touch screen 100 is turned off.

Also, the example shown in FIG. 9 may show that the object "f" presses more strongly the surface of the touch screen 100 at the second pressure P2 in a state where the example shown in FIG. 8 is maintained.

As such, in accordance with the magnitude of the input pressure of the object "f", the controller 130 may control the area of the second region operating in the display, mode to become larger.

In FIG. 8 or 9, while the object "f" is pressing the surface of the touch screen 100 after the second region of the display of the touch screen 100 is turned on, when the pressure at which the object "f" presses the surface of the touch screen 100 becomes greater than a second reference pressure Th2, the controller 130 may turn on the entire display of the touch screen 100 and control the initial screen or lock screen shown in FIG. 4 to be displayed. Here, the second reference pressure Th2 may have a value greater than that of the first reference pressure Th1 and may be predetermined.

In FIG. 8 or 9, when the pressure at which the object "f" presses the surface of the touch screen 100 becomes equal to or less than a third predetermined reference pressure Th3 after the second region of the display of the touch screen 100 is turned on, the controller 130 may control the second region of the display of the touch screen 100 to be turned off immediately after the pressure of the object "f" becomes equal to or less than the third reference pressure Th3 or after a predetermined delay time has elapsed from immediately after the pressure of the object "f" becomes equal to or less than the third reference pressure Th3. Here, the third reference pressure which causes the second region to be turned off may be the first reference pressure Th1 or may be 0. Here, the third reference pressure Th3 of 0 includes that the object "f" separates from the surface of the touch screen 100. Also, the third reference pressure Th3 may be any pressure Th4 between the first reference pressure Th1 and 0.

Meanwhile, in FIG. 8 or 9, when the object "f" separates from the surface of the touch screen 100 after the second region of the display of the touch screen 100 is turned on, the controller 130 may control to maintain the second region of the display of the touch screen 100 in the turned-on state. Subsequently, while the second region of the display of the touch screen 100 is maintained in the turned-on state, when the object "f" presses the surface of the touch screen 100 at a pressure equal to or greater than the third predetermined reference pressure, the controller 130 may control the second region of the display of the touch screen 100 to be turned off. Here, the third reference pressure which causes the second region to be turned off may be the first reference pressure Th1 or may be 0. Also, the third reference pressure Th1 may be any pressure Th4 between the first reference pressure Th1 and 0.

Figure 10:
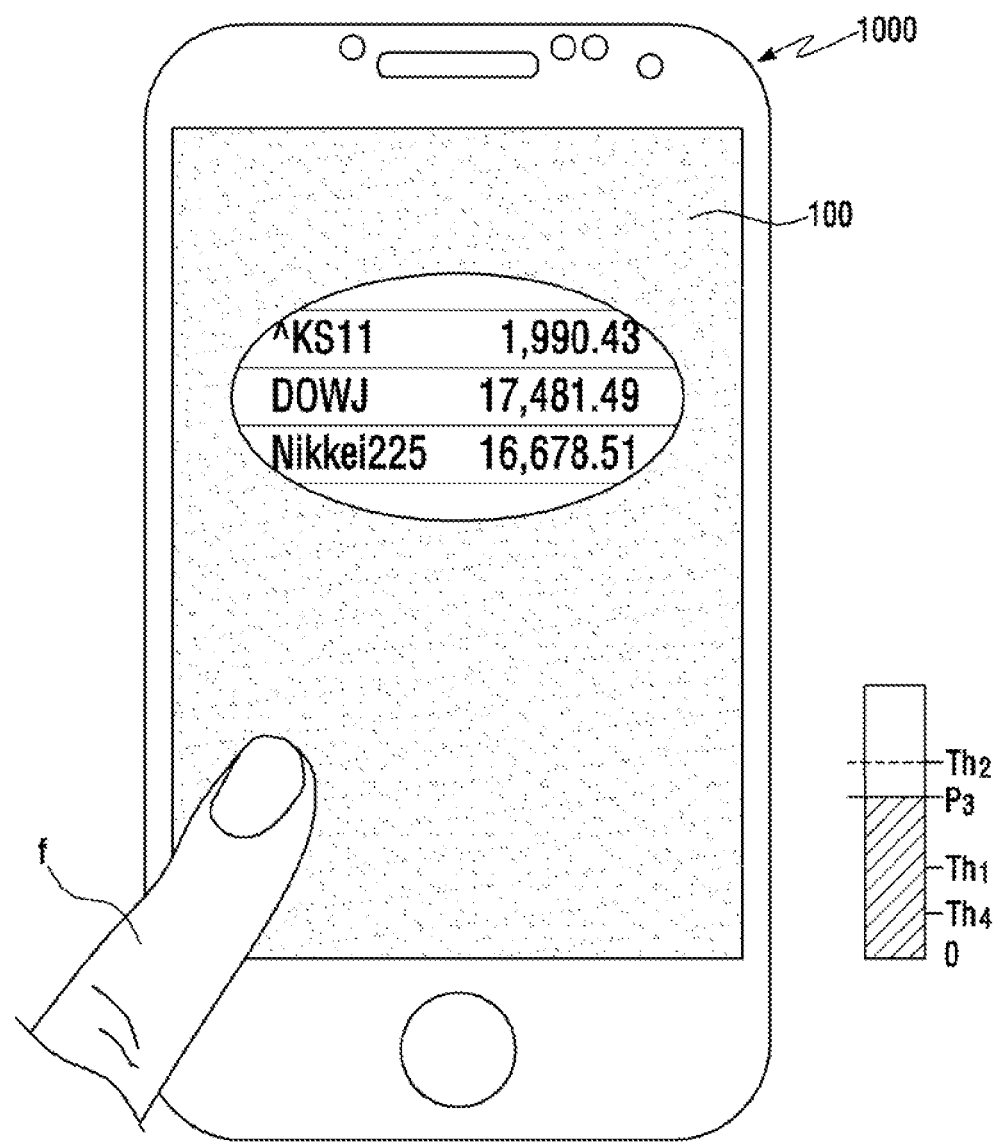
FIGS. 10 to 11 are views showing that the surface of the touch screen 100 displays in response to the touch on the surface of the touch screen 100 by the object "f" at a predetermined pressure.
Figure 11:
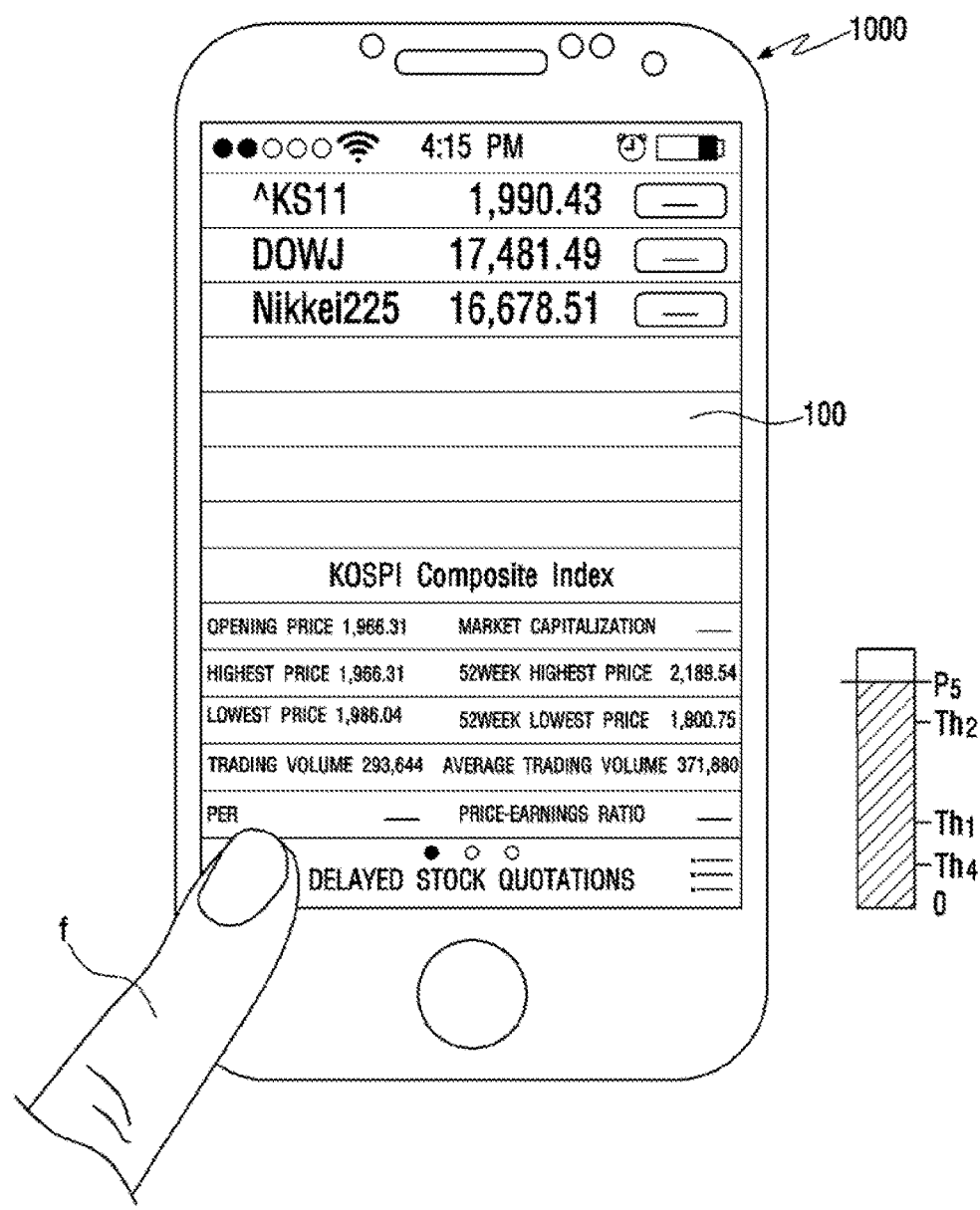

FIGS. 10 to 11 are views showing another example of the information which is displayed on the display of the touch screen 100 displays in response to the touch on the surface of the touch screen 100 by the object "f" at a predetermined pressure.

The example shown in FIG. 10 shows that the region where the object "f" touches the surface of the touch screen 100 is different from the region where the predetermined information is displayed. However, there is no limitation to this. As shown in FIGS. 6 and 7, the region where the object "f" touches the surface of the touch screen 100 may partially overlap with the region where the predetermined information is displayed, or any one of the two regions may be included in the other.

The example shown in FIG. 10 shows that the object "f" presses the first region of the surface of the touch screen 100 at a third pressure P3 in the state where the display of the touch screen 100 is turned off. In this case, the controller 130 shown in FIG. 1 turns on the second region of the display of the touch screen 100 and displays the predetermined information, and then controls to maintain the remaining regions in the turned-off state or controls the remaining regions to operate in a state equivalent to the turned-off state.

The magnitude of the third pressure P3 may be greater than that of the first reference pressure Th1. Here, the first reference pressure Th1 has the minimum pressure value for turning on the second region of the display of the touch screen 100. Here, the first reference pressure Th1 may be used to distinguish between a general touch (or 2D touch) and a pressure touch (or 3D touch) or may be different from a pressure which is used to distinguish between a general touch (or 2D touch) and a pressure touch (or 3D touch).

Here, the controller 130 ma display the predetermined information on the second region operating in the display mode. Unlike FIG. 8, the predetermined information to be displayed may be a portion of an execution screen of a predetermined application. Here, the predetermined application may be, as shown in FIG. 10, a stock application. However, there is no limitation to this. The predetermined application may include any application that the user has predetermined, for example, weather, calendar, widget, alarm applications, etc.

Although not shown in a separate figure, as shown in the example of FIG. 9, when the object "f" presses the surface of the touch screen 100 at a predetermined pressure which is greater than the third pressure P3 and is less than the second reference pressure Th2, the controller 130 may control, in response to the magnitude of the pressure of the object "f", the area of the second region operating in the display mode to become larger.

Also, when the object "f" presses the surface of the touch screen 100 at a pressure P5 greater than the second reference pressure Th2, the controller 130 may, in response to the pressure of the object "f", control, as shown in FIG. 11, to turn on the entire display of the touch screen 100 and control the entire execution screen of the predetermined application to be displayed.

In FIG. 10, when the pressure at which the object "f" presses the surface of the touch screen 100 becomes equal to or less than the third predetermined reference pressure after the second region of the display of the touch screen 100 is turned on, the controller 130 may control the second region of the display of the touch screen 100 to be turned off immediately after the pressure of the object "f" becomes equal to or less than the third reference pressure Th3 or after a predetermined delay time has elapsed from immediately after the pressure of the object "f" becomes equal to or less than the third reference pressure Th3. Here, the third reference pressure which causes the second region to be turned off may be the first reference pressure Th1 or may be 0. Here, the third reference pressure Th3 of 0 includes that the object "f" separates from the surface of the touch screen 100. Also, the third reference pressure Th3 may be any pressure Th4 between the first reference pressure Th1 and 0.

Meanwhile, in. FIG. 10, when the object "f" separates from the surface of the touch screen 100 after the second region of the display of the touch screen 100 is turned on, the controller 130 may control to maintain the second region of the display of the touch screen 100 in the turned-on state. Subsequently, while the second region of the display of the touch screen 100 is maintained in the turned-on state, when the object "f" presses the surface of the touch screen 100 at a pressure equal to or greater than the third predetermined reference pressure, the controller 130 may control the second region of the display of the touch screen 100 to be turned off. Here, the third reference pressure which causes the second region to be turned off may be the first reference pressure Th1 or may be 0. Also, the third reference pressure Th3 may be any pressure Th4 between the first reference pressure Th1 and 0.

Meanwhile, in accordance with the magnitude of the pressure applied by the object "f", the controller 130 may control mutually different information to be displayed on the second region of the display of the touch screen 100. This will be described with reference to FIGS. 9 and 10.

In the description with reference to FIGS. 9 and 10, it is assumed that the second pressure P2 of FIG. 9 is less than the third pressure P3 of FIG. 10.

When the object "f" presses the first region of the surface of the touch screen 100 that is in the turned-off state at the second pressure P2, the controller 130 shown in FIG. 1 may control the second region of the display of the touch screen 100 to operate in the display mode such that a portion of the initial screen in the second region is displayed. In the state where the a portion of the initial screen is being displayed on the second region and the object "f" pressing the surface of the touch screen 100, when the object "f" presses the surface of the touch screen 100 at the third pressure P3 greater than the second pressure P2, the controller 130 may control a portion of the execution screen of the predetermined application shown in FIG. 10 to be displayed on the second region where a portion of the initial screen is being displayed.

According to the user's setting, the controller 130 may first control a portion of the execution screen of the predetermined application shown in FIG. 10 to be displayed on the second region by a pressure greater than the first reference pressure Th1 and then control a portion of the initial screen to be displayed on the second region by a pressure greater than the first reference pressure Th1. Also, according to the user's setting, the controller 130 may control portions of the execution screens of at least two different applications to be displayed on the second region in accordance with the magnitude of the pressure.

Figure 12:
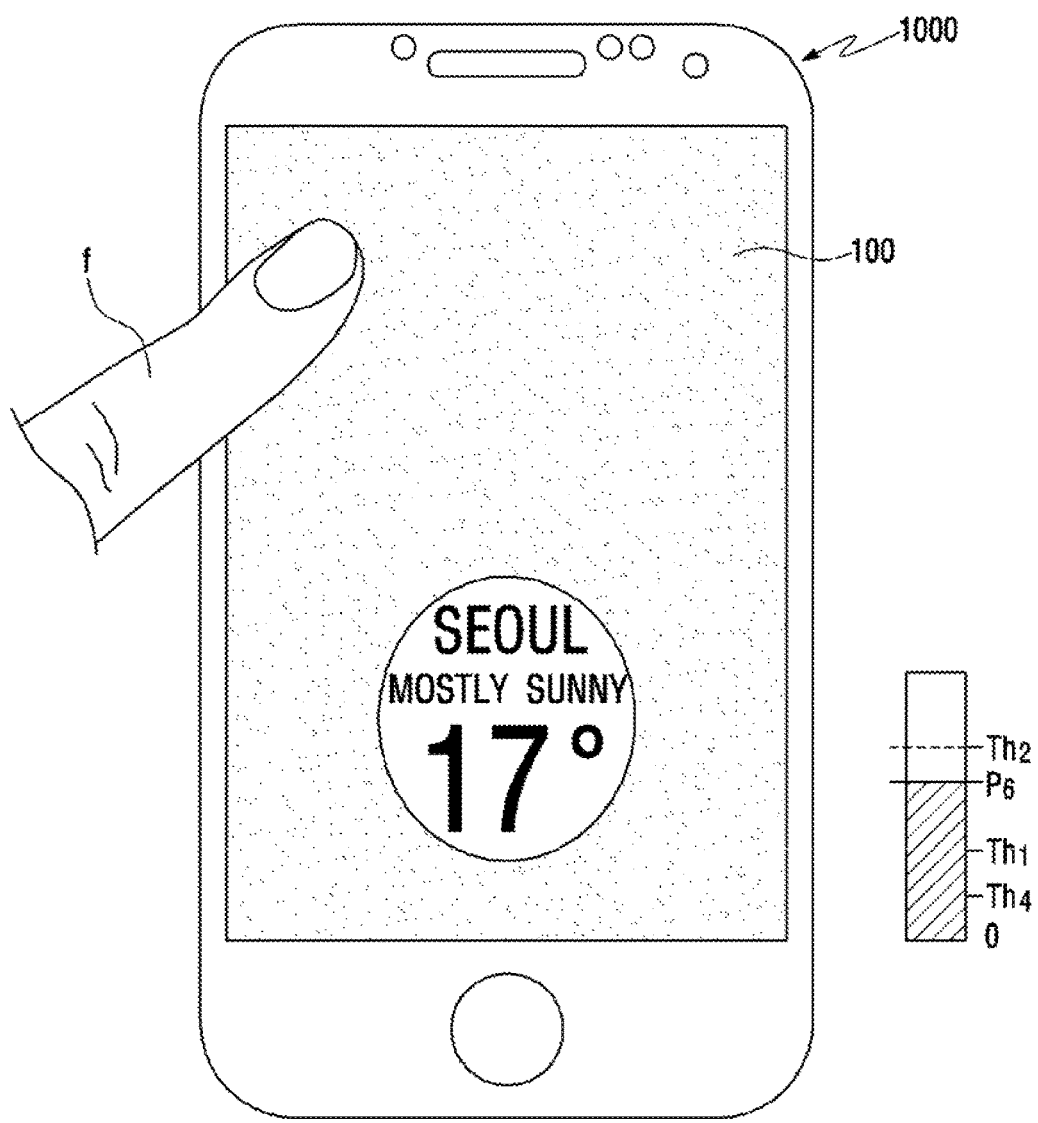
FIGS. 12 to 13 are views showing that the surface of the touch screen 100 displays in response to the touch on the surface of the touch screen 100 by the object "f" at, a predetermined pressure.
Figure 13:
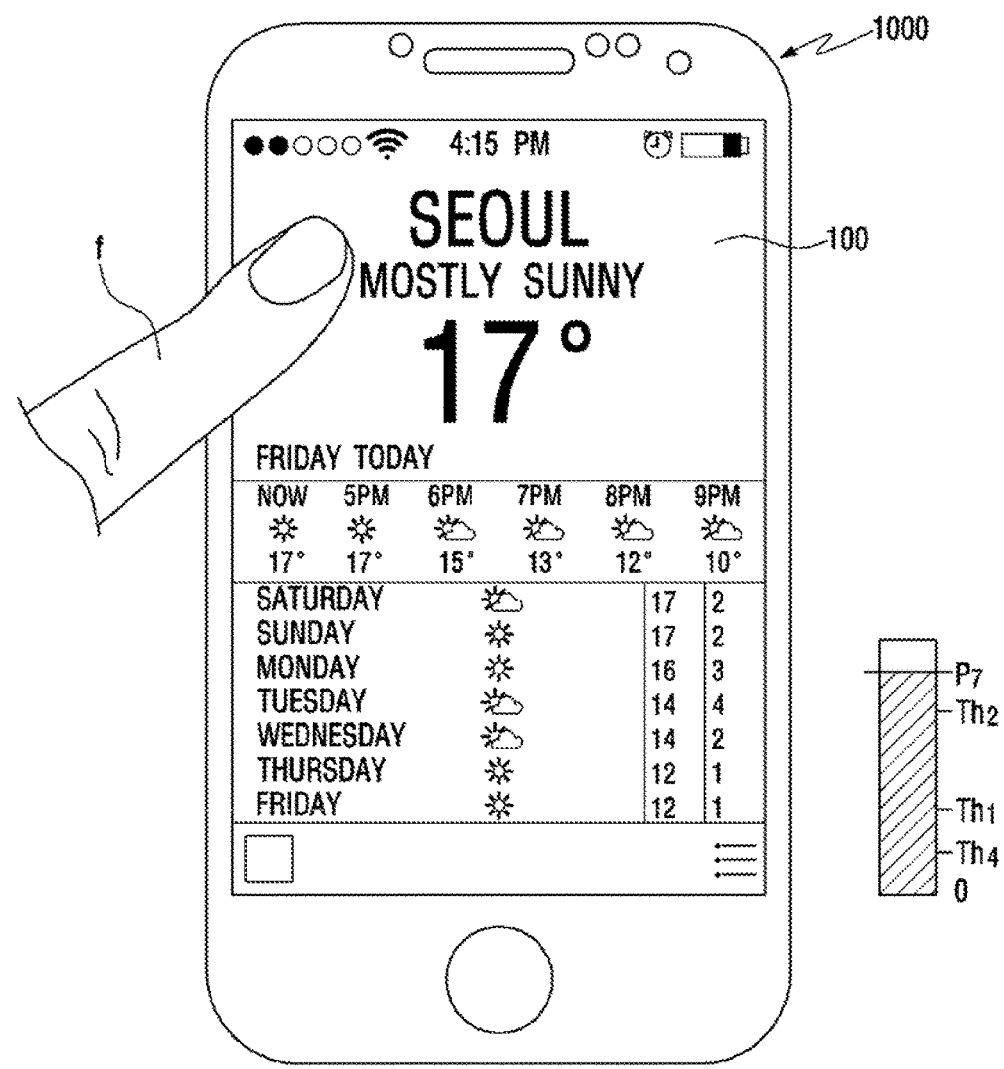

FIGS. 12 to 13 are views showing an example of information which is displayed on the display of the touch screen 100 in response to the pressing on the surface of the touch screen 100 by the object "f" at a predetermined pressure.

The example shown in FIG. 12 shows that the region where the object "f" touches the surface of the touch screen 100 is different from the region where the predetermined information is displayed. However, there is no limitation to this. As shown in FIGS. 6 and 7, the region where the object "f" touches the surface of the touch screen 100 may partially overlap with the region where the predetermined information is displayed, or any one of the two regions may be included in the other.

The example shown in FIG. 12 shows that, when the object "f" presses the first region of the surface of the touch screen 100 that is in the turned-off state at a sixth pressure P6, the controller 130 shown in FIG. 1 controls the second region of the display of the touch screen 100 to operate in the display mode then controls to maintain the remaining regions in the turned-off state or controls the remaining regions to operate in a state equivalent to the turned-off state.

The magnitude of the sixth pressure P6 may be greater than that of the first reference pressure Th1. Here, the first reference pressure Th1 has the minimum pressure value for turning on the second region of the display of the touch screen 100. Here, the first reference pressure Th1 may be used to distinguish between a general touch (or 2D touch) and a pressure touch (or 3D touch) or may be different from a pressure which is used to distinguish, between a general touch (or 2D touch) and a pressure touch (or 3D touch).

Here, the controller 130 may display predetermined information on the second region operating in the display mode. The predetermined information to he displayed may be a portion of the execution screen of a predetermined application such as a weather application.

The example shown in FIG. 12 shows that, when the object "f" touches the upper portion of the surface of the touch screen 100 that is in the turned-off state, the second region is displayed on the lower portion of the surface of the touch screen 100. The example shown in FIG. 8 or 9 shows that, when the object "f " touches the lower portion of the surface of the touch screen 100 that is in the turned-off state, the second region is displayed on the upper portion of the surface of the touch screen 100.

As such, when the display of the touch screen 100 is in the turned-off state, the controller 130 of the touch input device 1000 according to the embodiment of the present may control the positions of the second region where the predetermined information is displayed to be different from each other in accordance with the touch position of the object "f" which touches the surface of the touch screen 100.

Also, when the display of the touch screen 100 is in the turned-off state, the controller 130 may control, in accordance with the touch position of the object "f" which touches the surface of the touch screen 100, mutually different information to be displayed on the second region operating in the display mode.

Also, the controller 130 may control, in accordance with the magnitude of the pressure applied by the object "f", mutually different information to be displayed on the second region. For example, in the example shown in FIG. 12 when the object "f" presses the surface of the touch screen 100 at a pressure greater than the sixth pressure P6, the controller 130 may control a portion of the execution screen of the stock application shown in FIG. 10, instead of a portion of die execution screen of the weather application, to be displayed on the second region, and vice versa.

As shown in FIG. 13, when the object "f" presses the surface of the touch screen 100 at a seventh pressure P7 greater than the second reference pressure Th2, the controller 130 may control, in response to the pressure of the object the entire region of the display of the touch screen 100 to operate in the display mode, so that the entire execution screen of the predetermined application is displayed.

In FIG. 12, when the pressure at which the object "f" presses the surface of the touch screen 100 becomes equal to or less than the third predetermined reference pressure Th3 after the second region of the display of the touch screen 100 is turned on, the controller 130 may control the second region of the display of the touch screen 100 to be turned off immediately after the pressure of the object "f" becomes equal to or less than the third reference pressure Th3 or after a predetermined delay time has elapsed from immediately after the pressure of the object "f" becomes equal to or less than the third reference pressure Th3. Here, the third reference pressure which causes the second region to be turned off may be the first reference pressure Th1 or may be 0. Here, the third reference pressure Th3 of 0 includes that the object "f" separates from the surface of the touch screen 100. Also, the third reference pressure Th3 may be any pressure Th4 between the first reference pressure Th1 and 0.

Meanwhile, in FIG. 12, when the object "f" separates from the surface of the touch screen 100 after the second region of the display of the touch screen 100 is turned on, the controller 130 may control to maintain the second region of the display of the touch screen 100 in the turned-on state. Subsequently, while the second region of the display of the touch screen 100 is maintained in the turned-on state, when the object "f" presses the surface of the touch screen 100 at a pressure equal to or greater than the third predetermined reference pressure, the controller 130 may control the second region of the display of the touch screen 100 to be turned off. Here, the third reference pressure which causes the second region to be turned off may be the first reference pressure Th1 or may be 0. Also, the third reference pressure Th3 may be any pressure Th4 between the first reference pressure Th1 and 0.

The embodiments shown in FIGS. 3 to 13 can be performed when predetermined conditions are met.

The predetermined conditions may be that the object "f" touches the first region of the surface of the touch screen 100 at least twice for a first predetermined time period and the magnitude of the pressure of the final touch of the object "f" among a plurality of the touches is greater than that of the first reference pressure Th1.

The controller 130 shown in FIG. 1 determines whether or not the pressure at which the object "f" presses the surface of the touch screen 100 meets the above-described predetermined condition. If the condition is met, the controller 130 may control any one of the embodiments shown in FIGS. 3 to 13 to be performed, and if the condition is not met, the controller 130 may continue to maintain the display of the touch screen 100 in the turned-off state. Through the determination of the predetermined conditions, touch errors can be reduced.

The features, structures and effects and the like described in the embodiments are included in an embodiment of the present invention and are not necessarily limited to one embodiment. Furthermore, the features, structures, effects and the like provided in each embodiment can be combined or modified in other embodiments by those skilled in the art to which the embodiments belong. Therefore, contents related to the combination and modification should be construed to be included in the scope of the present invention.

Although the embodiments of the present invention were described above, these are just examples and do not limit the present invention. Further, the present invention may be changed and modified in various ways, without departing from the essential features of the present invention, by those skilled in the art. For example, the components described in detail in the embodiments of the present invention may be modified. Further, differences due to the modification and application should be construed as being included in the scope and spirit of the present invention, which is described in the accompanying claims.

What is claimed is:

1. A displaying method of a touch input device comprising a touch screen, a touch screen controller which detects a magnitude of a pressure of a touch input to a surface of the touch screen, and a controller which controls the touch screen on the basis of information detected by the touch screen controller, the displaying method comprising:
    detecting, by the touch screen controller, a magnitude of the pressure of the touch which is input to a first region when an object touches the first region of the surface of the touch screen in a state where a display of the touch screen is turned off;
    displaying by controlling, by the controller, the touch screen such that, when the detected magnitude of the pressure is greater than that of a first reference pressure, a second region of the display of the touch screen is displayed and a remaining region excluding the second region of the display of the touch screen continues in the turned-off state; and
    in the state where the second region is being displayed, turning-off, by the controller, the second region immediately after the magnitude of the pressure of the touch which is input to the first region becomes equal to or less than that of a predetermined third reference pressure,
    wherein the predetermined third reference pressure is greater than 0 and is equal to or less than the first reference pressure; and
    wherein, in the displaying, the controller controls a size of the second region to correspond to the magnitude of the pressure.

2. The displaying method of claim 1, wherein the first region does not overlap with the second region, and the first region is not surrounded by the second region.

3. The displaying method of claim 1, wherein at least a portion of the first region overlaps with a portion of the second region.

4. The displaying method of claim 1, wherein the first region is included in the second region.

5. The displaying method of claim 1, wherein, in the displaying, the controller controls a portion of an initial screen or lock screen to be displayed on the second region.

6. The displaying method of claim 5, wherein, in the displaying, when the magnitude of the pressure is greater than that of a second reference pressure, the controller controls the entire initial screen or lock screen to be displayed.

7. The displaying method of claim 1, wherein, in the displaying, the controller controls a portion of an execution screen of a predetermined application to be displayed on the second region.

8. The displaying method of claim 7, wherein, in the displaying, when the magnitude of the pressure is greater than that of a second reference pressure greater than the first reference pressure, the controller controls the entire execution screen to be displayed.

9. The displaying method of claim 1, wherein, in the displaying, the controller controls information which is displayed on the second region to be different in accordance with a position of the first region of the surface of the touch screen.

10. The displaying method of claim 1, wherein, in the displaying, when the object touches the first region at least twice for a first predetermined time period and a pressure of the final touch of the object is greater than the first reference pressure, the controller controls the touch screen such that the second region of the surface is displayed.

11. The displaying method of claim 1, wherein, in the displaying, the controller varies the size of the second region in proportion with the magnitude of the pressure.

12. A displaying method of a touch input device comprising a touch screen, a touch screen controller which detects a magnitude of a pressure of a touch input to a surface of the touch screen, and a controller which controls the touch screen on the basis of information detected by the touch screen controller, the displaying method comprising:

detecting, by the touch screen controller, a magnitude of the pressure of the touch which is input to a first region when an object touches the first region of the surface of the touch screen in a state where a display of the touch screen is turned off; and displaying by controlling, by the controller, the touch screen such that, when the detected magnitude of the pressure is greater than that of a first reference pressure, a second region of the display of the touch screen is displayed;

wherein, in the displaying, the controller controls information which is displayed on the second region to be different in accordance with the magnitude of the pressure.

13. The displaying method of claim 12, wherein the first region does not overlap with the second region.

14. The displaying method of claim 12, wherein at least a portion of the first region overlaps with a portion of the second region.

15. The displaying method of claim 12, wherein the first region is included in the second region.

16. The displaying method of claim 12, wherein, in the displaying, the controller controls a size of the second region to correspond to the magnitude of the pressure.

17. The displaying method of claim 12, wherein, in the displaying, the controller controls information which is displayed on the second region to be different in accordance with a position of the first region of the surface of the touch screen.

18. The displaying method of claim 12, wherein, in the displaying, when the object touches the first region at least twice for a first predetermined time period and a pressure of the final touch of the object is greater than the first reference pressure, the controller controls the touch screen such that the second region of the surface is displayed.

19. A displaying method of a touch input device comprising a touch screen, a touch screen controller which detects a magnitude of a pressure of a touch input to a surface of the touch screen, and a controller which controls the touch screen on the basis of information detected by the touch screen controller, the displaying method comprising:

detecting, by the touch screen controller, a magnitude of the pressure of the touch which is input to a first region when an object touches the first region of the surface of the touch screen in a state where a display of the touch screen is turned off; and displaying by controlling, by the controller, the touch screen such that, when the detected magnitude of the pressure is greater than that of a first reference pressure, a second region of the display of the touch screen is displayed;

wherein, in the displaying, in the state where the second region is being displayed, the controller controls to maintain the second region in a turned-on state when the object separates from the surface of the touch screen, and wherein, in the displaying, in the state where the second region is maintained in the turned-on state, the controller controls the second region to be turned off when the magnitude of the pressure of the touch which is input to the surface of the touch screen is greater than that of a third predetermined reference pressure.

20. The displaying method of claim 19, wherein the third reference pressure is the first reference pressure.

21. The displaying method of claim 19, wherein the third reference pressure is 0.

22. The displaying method of claim 19, wherein the third reference pressure is greater than 0 and is less than the first reference pressure.

23. The displaying method of claim 19, wherein the first region does not overlap with the second region.

24. The displaying method of claim 19, wherein at least a portion of the first region overlaps with a portion of the second region.

25. The displaying method of claim 19, wherein the first region is included in the second region.

26. The displaying method of claim 19, wherein, in the displaying, the controller controls a size of the second region to correspond to the magnitude of the pressure.

27. The displaying method of claim 19, wherein, in the displaying, the controller controls information which is displayed on the second region to be different in accordance with a position of the first region of the surface of the touch screen.

28. The displaying method of claim 19, wherein, in the displaying, when the object touches the first region at least twice for a first predetermined time period and a pressure of the final touch of the object is greater than the first reference pressure, the controller controls the touch screen such that the second region of the surface is displayed.

* * * * *